J. Y. ECKMAN.
Stalk-Cutter.
No. 161,873.
2 Sheets--Sheet 2.
Patented April 13, 1875.
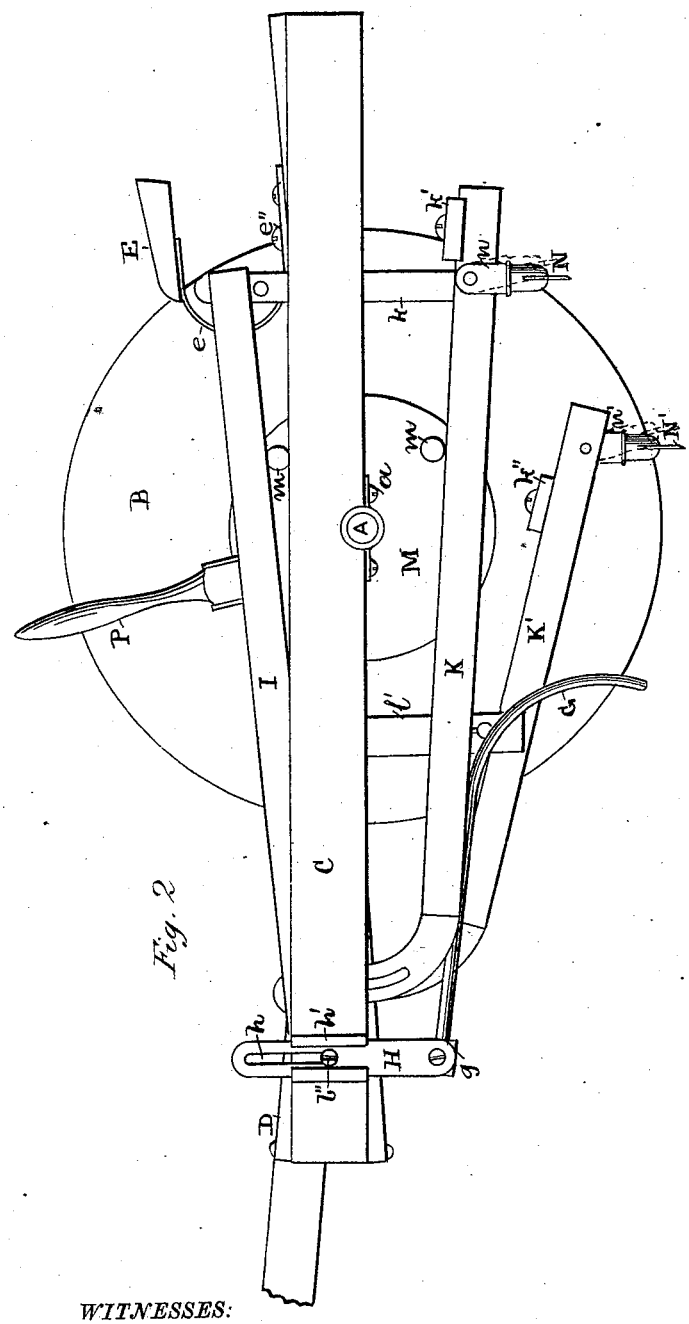
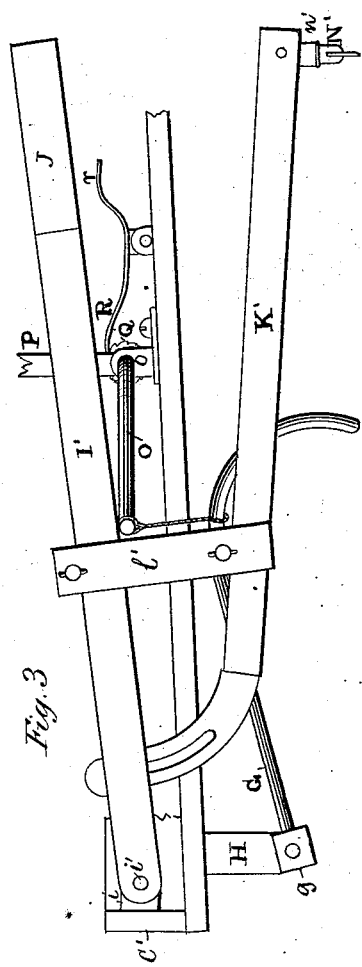
WITNESSES:
INVENTOR.
John Y. Eckman,
By W. B. Richards,
Atty.

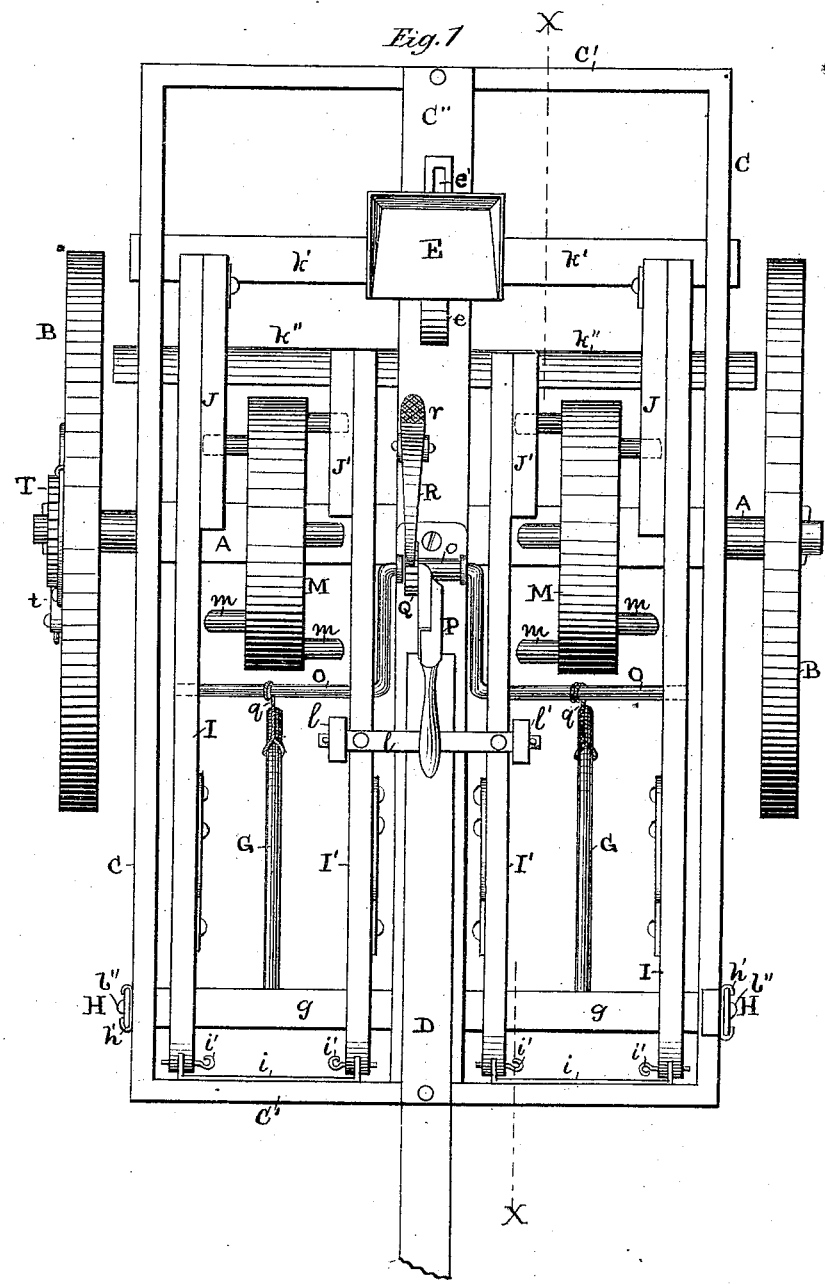

UNITED STATES PATENT OFFICE.

JOHN Y. ECKMAN, OF GALESBURG, ILLINOIS.

IMPROVEMENT IN STALK-CUTTERS.

Specification forming part of Letters Patent No. 161,873, dated April 13, 1875; application filed January 2, 1875.

*To all whom it may concern:*

Be it known that I, JOHN Y. ECKMAN, of Galesburg, county of Knox and State of Illinois, have invented certain Improvements in Stalk-Cutters, of which the following is a specification:

My invention relates to that class of agricultural implements known as stalk-cutters, which are used for chopping or cutting up the corn-stalks left standing in the field after harvesting a crop of corn.

The invention consists in certain new and improved devices and combinations of devices whereby the more perfect division of the stalks into small pieces is effected, so that they may be the more easily turned under in plowing the ground, and will not interfere with the cultivation of the growing crop.

In the accompanying drawings, Figure 1 is plan view of my improved machine. Fig. 2 is a side elevation of the same, with the near wheel removed, and Fig. 3 is a sectional view taken in the line $x\,x$ of Fig. 1.

Referring to the parts by letters, A represents the axle, and B B the wheels on which the machine is supported, and by the revolution of which motion is imparted to the operating devices, as hereinafter set forth. C C'' C' represents the side, central, and cross-bars respectively of a rectangular frame which is placed above the axle A, the latter being journaled in metallic bearing-plates $a\,a$ secured to the under side of the side bars C. D is the tongue or draft-pole, secured to the central bar C''. E is the driver's seat, supported on a bent spring-bar, $e$, the lower end of which is slotted longitudinally, as shown at $e'$, Fig. 1. A screw-bolt, $e''$, is passed through this slot into the central bar C'', to secure the driver's seat thereto, and the latter may be adjusted back and forth on said bar as far as the slot $e'$ will permit, by simply unscrewing the bolt $e''$, moving the bar $e$ to the desired position, and again tightening the bolt $e''$. G G are the gathering-hooks, used for bringing the corn-stalks into line, or to a proper position to be operated on by the chopping devices. The forward ends of the hooks G are secured to a cross-bar, $g$, the ends of which are pivoted to suspending-brackets H H. The upper ends of the brackets H are slotted, as shown at $h$, and are passed through grooved guide-plates $h'$, which are screwed to the outer sides of the side bars C C, as shown clearly by Fig. 2 of the drawings. By means of this device the forward ends of the gathering-hooks may be adjusted higher or lower, and secured in the desired position by tightening the screw-bolts $b''$, which are passed through the slots $h$ into the side bars C. I I and I' I' are bars, the forward ends of which are hinged or pivoted to the forward transverse bar C' of the frame by means of plates $i\,i$ screwed thereto, and having flanged or projecting ends which fit into grooves in the forward ends of the bars I I'. Pins or bolts $i'$ are passed laterally through the plates $i$ and bars I I' to form the hinges or pivots for the latter. The rear ends of the bars I I' are made wider, or are provided with blocks J J', for the purpose hereinafter set forth. K K and K' K' are bars, the forward ends of which are provided with plates having elongated slots, by means of which they are adjustably secured to the bars I I' near their forward ends. The two outer sets of these bars I I and K K are connected in rear by adjustable rods or bars $k\,k$, and the rear ends of the bars K K are also rigidly connected by means of a cross-bar, $k'$. The two inner sets of bars I' I' and K' K' are also rigidly connected together by a cross-bar, $k''$, and near their central parts by a cross-bar, $l$, and two pendent bars, $l'\,l'$. M M are two wheels rigidly secured to the axle between the outer and inner bars I I and I' I'. They are provided with a series of tappets or wipers, $m$, projecting laterally from both sides, which engage with the blocks J J' of the bars I I' as the wheels revolve, and operate to raise the hinged frames composed respectively of the series of bars I K and I' K' alternately, said frames falling by their own gravity when the particular tappet in contact with the block passes from under it. In this way it will be seen that the revolution of the axle and the tappet-wheels secured thereto alternately impart a rapid percussive movement to each of the hinged frames. N N are the chopping-blades. They are pivoted to the rear ends of the bars K K and K' K' respectively, by means of brackets $n\,n$ and $n'\,n'$, in such manner that when the swinging frames descend by their own gravity the blades will be in a vertical position, and strike the corn-stalks with the full force of the descending blow, but when the frames are being raised by the tappets they will swing rearwardly, as the forward motion of the machine draws them forward against the soil, and thereby offering no resistance to the progress of the machine from the dragging strain, and also preventing clogging of the cutters. O is a bent bar, pivoted at its center to a plate, o, secured to the center bar C'', and operated by a hand-lever, P, and ratchet Q, to raise and lower the gathering-hooks G, which are connected to it by cords or chains q q, and to raise and lower the cutters by means of its ends resting beneath the cutter-frames. R is a pawl, operated by a treadle, r, engaging with the ratchet Q to hold the cutter-frames in an elevated position, and also the gathering-hooks, from which position they may be instantly and easily released by the driver pressing his foot upon the rear ends of the treadles. T t is a ratchet and pawl connecting the wheel and axle in the ordinary manner, so that forward motion of the machine only operates the axle.

The operation is deemed obvious without further description.

I claim—

1. The combination of the hooks G, bar g, and brackets H, with the bar O, lever P, ratchet Q, and pawl R, all operated substantially as and for the purpose specified.

2. The swinging frames I K and I' K, independently hinged to the frame, and alternately operated by means of the tappet-wheels M M, substantially as and for the purpose specified.

JOHN Y. ECKMAN.

Witnesses:
W. B. RICHARDS,
M. H. BARRINGER.